United States Patent Office 3,361,647
Patented Jan. 2, 1968

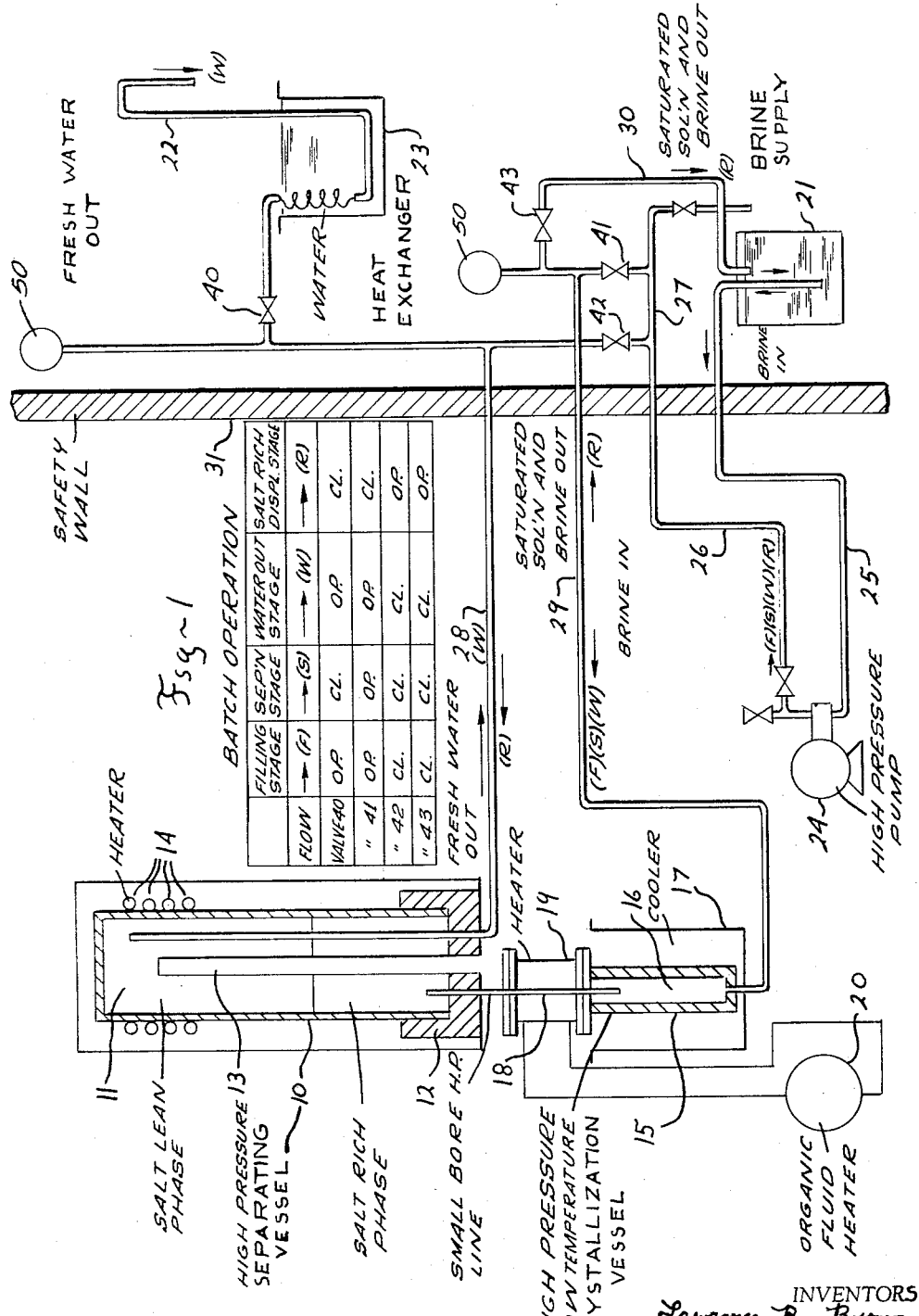

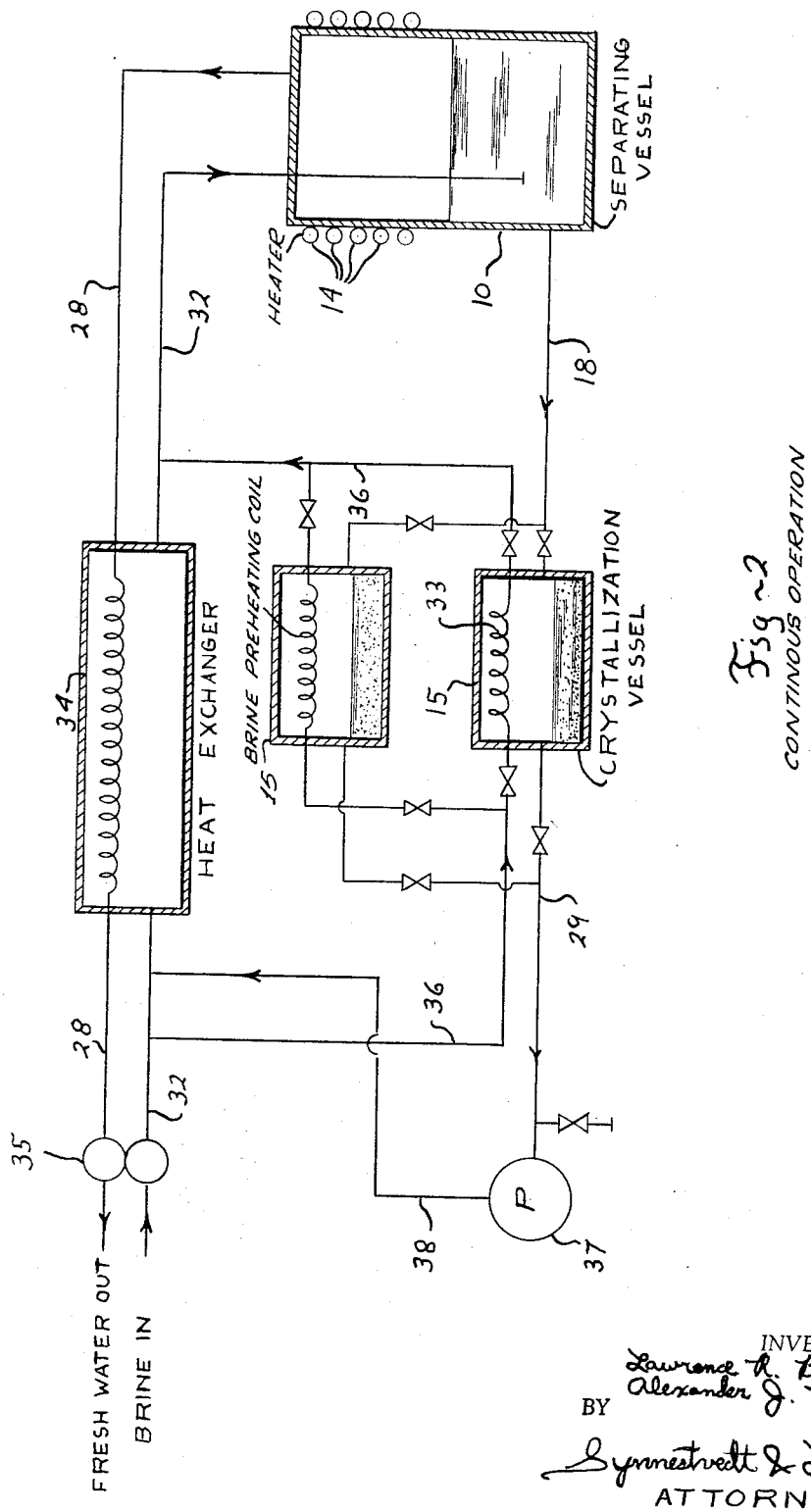

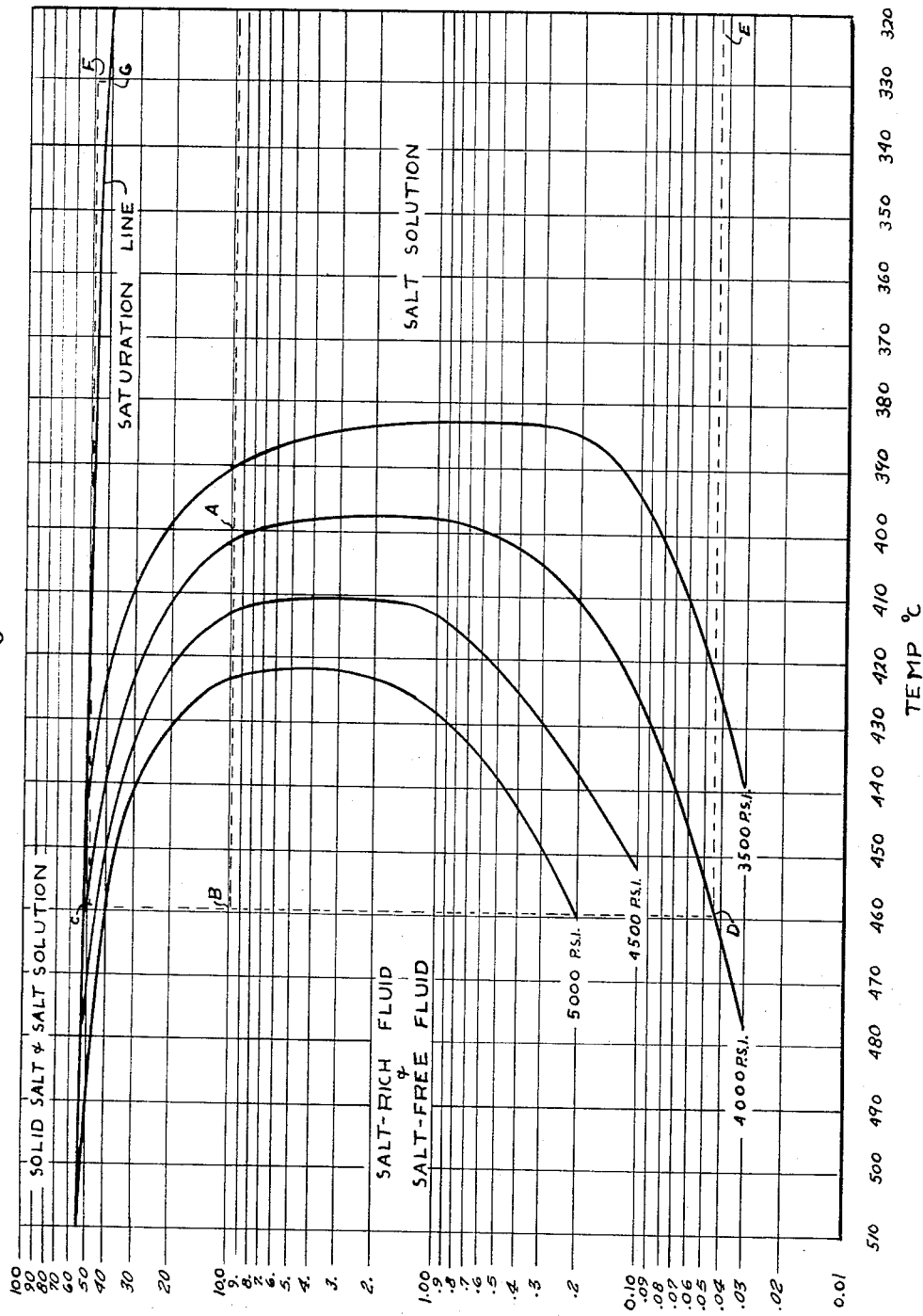

3,361,647
METHOD AND APPARATUS FOR CRYSTALLIZING SALT FROM BRINE
Lawrence R. Brown, La Plata, Md., and Alexander J. Reid, Feasterville, Pa., assignors to Publicker Industries, Inc., Philadelphia, Pa., a corporation of Pennsylvania
Filed Nov. 30, 1964, Ser. No. 414,817
5 Claims. (Cl. 203—11)

ABSTRACT OF THE DISCLOSURE

Salt and fresh water are produced from brine by subjecting the brine to temperatures and pressures above the critical temperature and pressure for water, thereby producing a separation of the brine into a salt rich phase and a salt lean phase. The salt lean phase is reduced in temperature and pressure to produce fresh water; the salt rich phase is reduced in temperature to produce solid crystalline salt, and a salt rich liquid, which is preferably recycled through the process, desirably, without pressure reduction upon it. Incoming and outgoing streams are heat exchanged and work exchanged with one another to recover the heat and work involved in reaching operating temperatures and pressures as fully as possible.

This invention relates to a method and apparatus which are useful in treating brines in order to obtain from them salt crystals and fresh water. The invention is especially concerned with a method and apparatus adapted to produce fresh water from fairly dilute brines without creating as an objectionable by-product concentrated brines. Concentrated brines have only limited utility, and, in fact, one of the most troublesome problems in the general art of treating brines to obtain fresh water from them is that of disposing of the substantial volumes of moderately or highly concentrated brine which are created in the processes heretofore used or contemplated.

According to the present invention the problems associated with disposing of concentrated brine by-product are eliminated by producing instead solid salt as a by-product. This presents several advantages. In the first place, the volume of the dry salt is considerably less than that of the by-product brine. Second, the dry salt has a wider range of uses than does brine. Additionally, in plants where one of the principal objects is the production of fresh or potable water, an operation in which salt rather than brine is the product is a more satisfactory operation in the sense that it represents a more complete utilization of the dilute brine as a raw material for the production of fresh water.

The present invention, in certain respects, is an improvement upon the general approach suggested by Von Platen in U.S. Patent 2,520,186. The present invention exploits certain properties displayed by salt-water systems at elevated super critical temperatures and pressures. In particular, the method of the invention, and the apparatus especially adapted for performance of the method, make use of the fact that at temperatures and pressures which are above the critical temperature and pressure for pure water, a salt-water system exists in two phases, one of which is a salt-rich fluid and the other of which is substantially salt-free fluid. Inasmuch as the phases differ sufficiently in density, they separate under the influence of gravity, the salt-free phase forming an upper layer of fluid and the salt-rich phase forming a lower layer of fluid.

In one of its important aspects, the present invention represents an improvement over the approach taught by Von Platen in that the dense brine phase formed at high super critical temperatures and pressures is not discarded as a by-product, but instead is treated to effect a further phase separation to yield crystalline salt as a by-product.

An important aspect of the present invention is that the exchange of heat between incoming feed brine on the one hand, and the product streams of salt-lean or substantially salt-free fluid, and denser salt-rich fluid, on the other hand, is carried out under much more favorable conditions than the similar heat exchange operation of processes performed at sub-critical conditions. In the present invention advantage is taken of the fact that at the same temperature the heat contents of the incoming brine, and of the salt-lean or steam-like phase, and the salt-rich phase are nearly the same. This permits much more complete exchange of heat between the phases or streams than is possible under sub-critical conditions where the salt-lean phase above its boiling point, for example, has a much higher heat content by reason of its heat of vaporization than does the incoming brine at the same temperature. Thus, under super critical conditions only a small amount of externally supplied heat is required to accomplish the same goal as an externally furnished large heat of vaporization at sub-critical conditions. This reduced heat demand makes possible a significant reduction in the cost of producing potable water.

Although the method steps and apparatus will be discussed in greater detail below, the following brief outline will provide a general understanding of the improvements involved. Dilute brine, such as is found in certain wells, is pumped into a separator under pressure. It is also heated; the heating may be performed as the brine is pumped into the separating vessel or while the brine is in the vessel, or, if desired, at both places. In any event, the temperature and pressure in the vessel and thus on the brine are raised to and maintained in the region where brine of the concentration being fed separates into two fluid phases, one of which contains very little salt, in fact, so little as to be considered potable and substantially salt-free, and a second phase which is salt-rich because it contains almost all of the salt. In the separator, these two phases segregate themselves into two distinct layers, because of the differences in density between the two.

At least a part of the lower salt-rich phase is withdrawn from the separator vessel to another vessel where the pressure is maintained at approximately the same value as that of the separator, but where the temperature is lower, preferably substantially lower. Under these conditions of temperature and pressure the salt-rich fluid which formed the lower phase in the separator itself becomes divided into two phases in the second chamber. One of these phases is solid crystalline salt and the other phase is a supernatant mother liquor of saturated salt solution or brine, the brine being saturated at the temperature and pressure existing in the second camber.

The second chamber may be termed a crystallization chamber, and it should be noted that it is desirably of substantial volume as compared to the volume flow rate of the salt-rich fluid into the chamber or, alternately considered, the volume flow rate of the saturated brine out of the crystallization chamber. Thus, the space velocity of the material in the chamber will be relatively low.

At least part of the mother liquor or saturated brine is recycled into the feed brine. This may be performed by returning the saturated brine to the supply reservoir or by pumping it into the feed line to the separator chamber. The saturated brine should be diluted sufficiently to prevent crystallization upon further cooling or should be maintained in temperature so that further crystallization will not occur. In general, the return of the saturated brine to the feed line (latter system), is preferred, since it does not involve a waste of the work which has been performed in placing the material forming the saturated brine under the high pressure existing in the system.

The relatively large volume of the crystallization chamber provides storage space for the crystalline salt product which is formed. Ultimately the greater part of the space will be occupied by salt, at which time the crystallization chamber involved must be pulled off stream and the salt unloaded therefrom. If desired, a battery of two or more salt chambers connected in parallel and utilized alternately can be employed in order to bring about continuous operation.

The salt-free fluid phase in the separator chamber, when cooled and reduced in pressure forms a valuable product, namely, potable water. In order to recover such water, the light phase is drawn off from the separator chamber and is cooled, for example by heat exchanging it with incoming brine, and further is reduced in pressure, for example by work exchanging it with incoming low pressure brine in a work exchange pump, and the water so recovered from this phase is delivered to storage. In order to make up the reduction in the volume of fluid in the separating chamber, occasioned by the beforementioned withdrawals of salt-rich fluid and salt-free fluid, fresh feed brine, preferably enriched by recycled saturated brine from the crystallizer is pumped into the separating chamber.

From the foregoing it can be seen that among the objects of the present invention is the improvement of high pressure systems for separating salt from water.

Another object of the invention is to provide a brine treating system in which the final products are fresh potable water and substantially dry crystalline salt.

Still another object of the invention is the provision of a brine treating system which will provide an economical source of fresh water.

Other objects and purposes together with the above objects can be better understood by considering the detailed description which follows together with the accompanying drawings in which:

FIGURE 1 is a diagrammatic elevational view showing an apparatus constructed according to the invention for batch type operation;

FIGURE 2 is a diagrammatic elevational view of an apparatus according to the invention adapted for continuous or semi-continuous operation; and FIGURE 3 is a graph presenting some approximate phase data for salt-water systems.

Attention is first directed to FIGURE 1 which illustrates a batch type apparatus. The equipment includes a first pressure vessel 10 having in it a separating chamber 11. The first pressure vessel or separating vessel is preferably constructed of high strength material such as steel so that it will safely withstand pressures of the order of 5000 pounds per square inch absolute and temperatures in the neighborhood of 500° C. As can be seen from the figure, the vessel is provided with a lid 12 at the bottom which may be secured in place by bolting or by other well-known techniques suitable for a high pressure environment. In order to facilitate the taking of temperature measurements within the pressure vessel 10, a thermocouple well 13 is provided. In the embodiment of the apparatus shown in FIGURE 1, it is contemplated that the heat required to raise the temperature into the super critical region will be supplied at the pressure vessel rather than in preheaters. For this reason, the pressure vessel 10 is provided with heating elements diagrammatically indicated at 14. These elements may be of various kinds, for example, a wrapping of high resistance wire, cartridge type resistance heaters, or a fluid heat exchange system such as molten salt baths.

Mounted adjacent the first pressure vessel 10, and preferably below it, is a second pressure vessel 15 having within it a crystallization chamber 16. The second pressure vessel or crystallization vessel 15, like the separating vessel 10, is constructed to withstand high pressures. However, in the preferred system of operation, the crystallization chamber is held at a low temperature as compared to the temperature maintained in the separating chamber. To maintain this low temperature, it is necessary to withdraw heat from the contents of the crystallization chamber, and for this reason a cooling water jacket or vessel 17 is provided for the crystallization vessel 15.

A high pressure connecting line 18 runs between the lower portion of the separation chamber 11 and the upper portion of the crystallization chamber 16. As will appear when the operation of this equipment is explained below, the line 18 is utilized, among other things, for carrying salt-rich fluid forming the lower dense phase in the separation chamber into the crystallization chamber. Those skilled in the art will appreciate that in apparatus of modest size, high pressure lines such as 18 are usually thick walled tubes having a small bore. Thus it can be seen that there is a considerable danger of the salt-rich fluid depositing salt in the line 18 which even as loose crystals would effectively block it and prevent successful performance of the operation. In order to eliminate this potential difficulty, the line 18 is provided with a heater element 19 which in the apparatus shown in FIGURE 1 is an organic fluid heat exchange unit of the Dowtherm type. The heater for the Dowtherm system appears at 20.

A brine supply container 21 holds the brine which is to be processed in the apparatus. A fresh water outlet line 22 is provided for drawing off the fresh water product of the operation. As can be seen in the figure, heat exchanger 23 is preferably included in the fresh water line. Water or brine or other liquids may be used as the cooling medium in heat exchanger 23. A pump 24 is utilized to deliver brine to the system and to establish and maintain the high pressures under which the system is operated.

The pump 24, the fresh water outlet 22, the brine supply 21 and the two pressure vessels 10 and 15 are interconnected with feed lines. Among the feed lines are a pump input line 25 running from the brine supply 21 to the pump 24, and a pump output line 26 which runs between the high pressure side of the pump and a manifold 27. At the manifold, are valves by which the pump output line may be selectively connected to an upper feed line 28 which runs from the manifold to the pressure vessel 10 and into the interior thereof to a point near the upper end of the separation chamber. The lower feed line 29 runs between the manifold 27 and the lower portion of the crystallization vessel 15. As can be seen on the figure, the lower feed line 29 is tapped between the manifold and crystallization chamber to provide a valved connection to a brine concentrate return line 30 which leads from the lower feed line 29 back to the brine supply 21.

Inasmuch as the pump and the pressure vessels 10 and 15 operate at very high pressures, good safety practices suggest that they be positioned behind a safety wall 31.

Gauges 50 are provided for monitoring pressure.

The apparatus in the embodiment of FIGURE 2 includes a pressure vessel 10 similar to the separating vessel of the same number shown in FIGURE 1. Once again, this vessel should be constructed to withstand high temperatures and pressures, and is preferably equipped with heating elements 14. The arrangement of lines connected to the separating vessel 10 in FIGURE 2 is modified somewhat in that three lines are connected to it instead of the two lines employed in the batch unit of FIGURE 1. Thus in addition to interconnecting line 18, and upper line 28, there is provided a brine feed line 32. In the preferred arrangement, the brine feed line 32 delivers brine to the chamber in the lower middle region thereof, but if other factors make it more convenient, the brine can be delivered to the chamber at substantially any point, so long as the incoming brine does not overly disturb the quiescence of the upper fluid layer.

In this embodiment, as in FIGURE 1, the interconnecting line 18 is preferably heated to insure that it will remain clear and will not clog with precipitated salt. The second pressure vessel or crystallization vessel 15 in the embodiment of FIGURE 2 is somewhat modified in construction as compared with the corresponding pressure vessel in the batch unit of FIGURE 1. It is, however, similar in that it is heavily constructed to withstand substantial pressures. It is desirably provided with a hatch of known construction, which is pressure tight, but which can still be removed fairly readily. In this way access can be gained to the interior of the crystallization vessel for periodic removal of the accumulated crystalline salt therein. The crystallization vessel 15 is provided with a cooling coil 33 which is shown diagrammatically in the figure.

A heat exchanger 34, also shown diagrammatically, is utilized to provide heat exchange between lines 28 and 32. As will be explained later, this arrangement results in transfer of most of the sensible heat from outgoing fluid in line 28 to incoming brine in line 32.

A work exchange type pump 35 is placed across lines 28 and 32. Such a pump may be of a known type, for example, the type disclosed by Von Platen in beforementioned U.S. Patent 2,520,186 in FIGURES 4 or 6. Those skilled in the art will understand that in such a pump, the work which has been performed in placing the outgoing fluid in line 28 under high pressure is in large measure recovered by utilizing the pressurized fluid as the driving fluid in the pump. The extraction of energy from the salt free fluid in line 28 results in a lowering of the pressure on that fluid. Thus the salt-free fluid in line 28 does work in driving pump 35, and the pump 35 does work in transporting and pressurizing the incoming brine 32 thus effecting a work exchange. The work which was originally put into pressurizing the material which is now leaving the system by line 28 is recovered and utilized to pressurize the new material entering the system through line 32. By reason of the well-known laws of thermodynamics, it is not possible to obtain enough work from the outgoing stream to meet the complete pumping requirements for the incoming stream. Therefore, additional energy from outside must be supplied to the pump. However, from the discussion thus far it can be seen that the energy so required may be considered "make up" energy to supplement and sustain the energy stored in the system.

Consideration of FIGURE 2 will reveal that an auxiliary line 36 is provided which by-passes the heat exchanger 34. This line includes the coil 33 in the crystallization chamber 15. Thus it can be seen that a portion of the incoming brine in line 32 is diverted through the coil 33 in the crystallization chamber to remove heat from the fluid contained therein and thus to become heated before it rejoins the main stream of incoming brine which is heated in the heat exchanger 34.

A lower feed line 29 runs from crystallization vessel 15 to recycle pump 37. A recycle line 38 runs between the recycle pump and the incoming brine feed line 32. It joins line 32 on the high pressure side of the pump 35, but on the low temperature side of the heat exchanger 34. It will be appreciated that the material in line 29 is under almost the same pressure as exists in the crystallization chamber 15 and the separating vessel 10, but this pressure is of necessity slightly less than the pressure near the outlet of the feed pump 35. Hence, recycle pump 37 is utilized to increase the pressure of the saturated brine in line 29 before it is recycled through line 38 to the incoming stream. Under the preferred operating conditions a 100% recycle is employed, but if desired part or all of the saturated brine in line 29 may be tapped off.

The principles involved in the present invention may perhaps be more fully appreciated by considering the phase diagram of FIGURE 3. This diagram represents experimental data obtained from a study of salt-water systems under conditions of high temperature and pressure. On the vertical axis of FIGURE 3 is a logarithmic scale calibrated in percentage of salt in a salt-water system. On the horizontal axis is a linear scale calibrated in centigrade degrees. It should be noted that the horizontal scale is reversed with respect to the conventional arrangement and that as a consequence lower values of temperature appear toward the right on the scale and higher values appear toward the left. The saturation line for salt-water systems is plotted on the upper portion of the figure. Four isobars showing phase boundaries at four selected pressures, namely, 5,000 p.s.i.a., 4,500 p.s.i.a., and 4,000 p.s.i.a., and 3,500 p.s.i.a. are plotted on FIGURE 3. Also marked on the phase diagram are legends indicating the phases present under equilibrium conditions in various zones of the phase diagram. A trace of a process conducted according to the invention is shown in the diagram in dashed lines.

As outlined before, the process contemplates elevating a brine solution in temperature and pressure. Consider that this operation is being performed on a salt-water system having a total salt concentration of about 10%. A point such as point A at 400° on the dashed line in FIGURE 3 corresponds to an early stage in the process of raising the temperature and pressure on such a system. Suppose that the pressure at point A has been raised to about 4,000 p.s.i.a. From the location of point A on the diagram, one can conclude that the system at this point in the operation consists of one phase, namely, a solution of salt in water.

Suppose now that the temperature is raised but the pressure on the system is maintained at 4,000 p.s.i.a. The over-all composition of the system, of course, does not change. Point B on the dashed process line of FIGURE 3 represents the condition just described. However, a consideration of FIGURE 3 will show that the phase boundary line for 4,000 p.s.i.a. has been crossed, and that for a system at point B there must exist two phases, namely, a solution or fluid rich in salt, and a solution or fluid very lean in salt, in fact, so lean as to be substantially salt free. The composition of the salt-rich phase at the temperature under consideration is indicated at point C where a vertical line at this temperature intercepts the isobar for 4,000 p.s.i.a. From the phase diagram it can be seen that this concentration is on the order of 50% and is thus considerably more concentrated than the incoming brine concentration. The concentration of the very lean or salt-free solution is shown at point D where the vertical line for the temperature again crosses the 4,000 p.s.i.a. isobar. It can be seen that this concentration is on the order of .045% which is well within the potable range.

Inasmuch as the salt concentrations of the two phases are considerably different, the densities are correspondingly quite different, with the salt-rich phase being heavier than the salt-free phase. For this reason, when the two phases coexist in the same vessel, they are gravimetrically segregated into two different layers with a more or less distinct boundary between the two layers. By judicious placement of piping in a vessel containing the two phases arranged in layers, one can withdraw fluid consisting almost exclusively of one layer or the other.

The low salt fluid having the composition represented by the point D can be converted into liquid water of the same composition by being separated from the salt-rich fluid and cooled down, for example toward and beyond the point E. This part of the operation can most conveniently be performed by withdrawing part of the salt-free layer from the separating chamber and cooling it in a separate chamber, such as a heat exchanger.

If the salt-rich phase represented by the point C is separated from the low salt fluid and cooled, the process moves along the dashed line on FIGURE 3 toward the right to point F and beyond. It can be seen that this part of the process line crosses a phase boundary, namely the saturation line, during the cooling step. (At this point it should be noted that the saturation line for salt-water systems is not very pressure sensitive, and for this reason the saturation line on FIGURE 3 may conveniently be thought of as the trace of a series of isobars which very nearly coincide with each other.) The process line, by crossing the saturation line, moves into a region of the phase diagram where a second phase separation takes place. One of the phases is solid salt and the other phase is a solution which is saturated at the temperature and pressure involved. For example, if the solution is cooled to about 330° C., it will separate into solid salt and a supernatant solution having the composition indicated by point G, that is, about 40%. An inspection of the phase diagram will reveal that while the overall composition of the portion of the system which formed the salt-rich layer is unchanged, after the second phase separation of this layer into salt and saturated brine, the concentration of the saturated brine phase represented by point G is significantly less than the concentration of the dense layer before separation.

One further comment is in order with respect to the phase diagram of FIGURE 3. The isobars shown on the figure are located well into the super critical region for pure water.

With the foregoing outline of the phase relations involved in hand, attention can now be turned to the manner in which the apparatus of FIGURES 1 and 2, which has already been described, is operated. Consider FIGURE 1 first. The initial step in a batch operation performed in this equipment is the pumping of brine from the supply 21 by means of pump 24 through lines 25 and 26 to the manifold 27. From this point the brine enters the lower feed line 29 through which it passes into the crystallization vessel 15 and ultimately into the separation vessel 10. During the filling of the two vessels the valve 40 is left open so that the air which initially filled the two vessels may be exhausted through line 22. When the system has been filled with brine, valve 40 is closed, but pump 24 continues to operate to build up the pressure in the pressure vessels 10 and 15. The heaters for the separation chamber 11 and for the connecting line 18 are turned on and the temperature of the brine in the separating chamber is thus raised. However, the temperature in the crystallization chamber 16 is not raised, since that chamber is surrounded by cooling means. The heaters and the pump bring the temperature and pressure conditions in the separating chamber 11 up to values at which the salt-water system separates, in the manner described above, into an upper low-salt phase or substantially salt-free phase and a lower salt-rich phase.

At this point in the operation, valve 40 is opened, and additional brine is pumped into the bottom of the crystallization chamber 16. The flow rate of brine in and the flow rate of salt-free fluid out are adusted so that the pressure and temperature in the separating chamber 11 are maintained at the proper preselected values. In this way, the salt-free fluid is forced from the separating chamber into the upper feed line 28 where it passes through valve 40 into the heat exchanger 23 and ultimately out line 22 as potable water. As the salt-free layer is removed from the separating chamber in the manner just described, the boundary between it and the salt-rich layer moves upwardly through the separating chamber 11. When this boundary has reached a suitable height (which is determined in part by the salt-holding capacity of the crystallization chamber 16), valve 40 is closed, thus ending the removal of fresh water from the system. At the same time valve 41 at the manifold 27 is closed and valve 42 at the manifold is opened. This results in a reversal of the general flow through the system, that is to say, brine is now pumped into the system through upper feed line 28, instead of being pumped in through lower feed line 29. In addition, valve 43 is opened, thus permitting flow of liquid out through feed line 29. The changes just described result in lean feed brine being pumped into the top of the separating chamber to displace the salt-rich phase downwardly through connecting line 18 into the crystallization chamber 16. The feed brine which had been in the crystallization chamber 16 is forced out through line 29 and valve 43 and is returned by means of line 30 to the brine supply 21.

After the salt-rich phase has been displaced into the crystallization chamber, the maintenance of pressure on the system is continued, and heat is withdrawn from the salt-rich phase by means of the cooling means 17. The salt-rich phase thus cools, and crystalline salt precipitates from it without forming a scale on the heat exchange surfaces, leaving a saturated solution.

The operation is completed by pumping the saturated solution out of the system by means of lines 29 and 30 to return it to the brine supply 21, and by opening the crystallization chamber 16 after the pressure therein has been reduced to gain access to and remove the crystallized salt therein.

Turning now to FIGURE 2, it can be seen that feed brine is introduced into the system in line 32 and is pumped by the work exchange pump 35 which also places it under the operating pressure for the system. From pump 35 the feed brine passes through heat exchanger 34 where it is raised in temperature by the outgoing initially hot salt-free fluid. It is preferred that the heat exchanger 34 be operated in a countercurrent arrangement as is shown in FIGURE 2. A portion of the pressurized feed brine is diverted around heat exchanger 34, passing through coil 33 where it is raised in temperature by the salt-rich phase in the crystallization chamber. Line 36 returns the side stream of feed brine to line 32 on the hot side of heat exchanger 34. Line 32 then carries the feed brine into the separator vessel 10. Heaters 14 on the separator vessel establish and maintain the temperature at that required for separation into salt-rich and salt-lean phases having the salt concentrations desired, and the fluids are pressurized to the required pressure by pump 35, supplemented by auxiliary pumping means.

Fresh brine is fed in line 32 at a preselected rate. Salt-free fluid is withdrawn through line 28, and salt-rich is withdrawn through line 18, at rates which are coordinated with the preselected input rate so that the boundary between the salt-free layer and the salt-rich layer in the separator vessel 10 remains at reasonably constant level.

The salt-free fluid passes out through line 28 through heat exchanger 34 and work exchange pump 35 to suitable fresh water storage facilities. The salt-rich phase passes out of the separation chamber through line 18 and into crystallization vessel 15. There it is reduced in temperature so that solid crystalline salt is deposited in the crystallization chamber. The heat given up by the salt-rich fluid is in large measure transferred to the incoming brine passing through coils 33. The saturated salt solution remaining after deposition of the crystalline salt leaves the crystallization vessel 15 and is pumped back into line 32 by means of the recycle pump 37.

After the passage of a period of time under the above mode of operation, the precipitated salt in the crystallization vessel 15 will occupy such a large volume of the crystallization chamber that the operation will not proceed as satisfactorily as is desired. At this point a run is terminated and the crystallization vessel is opened and the deposited salt removed therefrom for marketing or for further treatment. If desired a plurality of crystallization vessels 15 may be provided for each separating vessel 10 in a plant. In such a situation the crystallization vessels are connected into the system in parallel, and while one is in use another is off stream being cleaned out.

Some preferences with respect to operating conditions can be given. It should first be noted that the process line sketched on FIGURE 3 was selected for clarity of illustration, and does not necessarily represent a preferred process. The optimum conditions for an operation depend in part upon the characteristics of the feed brine.

Considerable flexibility is possible, but it is preferred that the temperature and pressure in the separator vessel be such that the composition of the salt-rich phase (i.e., the composition at point C) be well above the concentration of a saturated solution under the pressure and temperature conditions maintained in the crystallization vessel. This will tend to maximize the rate of precipitation of crystalline salt in that chamber. It is also preferred that the temperature and pressure conditions in the separator vessel be maintained at levels sufficient to insure that the salt concentration of the substantially salt-free phase is so low that the water recovered by cooling and depressurizing this phase is potable, or at least suitable for the purposes intended. Water containing as much as .05% salt is still considered generally fit for human consumption, while water containing as much as 0.0016 g./ml. can be used for some agricultural purposes.

In the continuous system of FIGURE 2, with a 3.00% feed brine solution, about .970 pound of fresh water are recovered through line 28 for each pound of brine fed into the system through line 32 and about 0.90 pound of salt-rich fluid including recycle are withdrawn from the separating chamber per pound of brine fed. This in turn is separated into about .030 pound of salt for every pound of feed and about .060 pound of 28.0% mother liquor. The approximate material flow rates just given are for a system in which the pressure in the separation vessel 10 and the crystallization vessel 15 is about 4500 p.s.i., and in which the separator temperature is about 470° C. and the crystallization temperature about 100° C.

We claim:

1. A method for crystallizing salt from brine comprising introducing brine into a separation chamber, establishing a temperature and pressure in the brine in excess of the critical pressure and temperature of pure water and sufficient in relation to each other to effect a phase separation between a lower layer of salt-rich fluid and an upper layer of substantially salt-free fluid, delivering at least a portion of the lower layer into a subjacent interconnected crystallization chamber of substantial volume in relation to the flow rate of the lower layer and maintained at substantially the same pressure as the separation chamber, cooling the salt-rich fluid in the crystallization chamber to a temperature below the temperature maintained in the separation chamber to thereby effect crystallization of salt in loose crystallized form from said salt-rich fluid and leaving a saturated brine, and displacing the substantially salt-free fluid from the upper portion of the separation chamber by introducing feed brine into the separation chamber.

2. A method for crystallizing salt from brine comprising continually delivering brine to and introducing it into a separation chamber, establishing a temperature and pressure in the brine in excess of the critical pressure and temperature of pure water and sufficient in relation to each other to effect a phase separation between a lower layer of salt-rich fluid and an upper layer of substantially salt-free fluid, continually withdrawing a portion of said salt-free fluid from the separation chamber, heat exchanging said withdrawn salt-free fluid, while maintaining it under a pressure substantially equal to that in the separation chamber, with brine being delivered to said separation chamber, whereby to raise the temperature of said brine and cool said salt-free fluid, work exchanging said cooled pressurized salt-free fluid with cool low pressure incoming brine in a work exchange pump, whereby to reduce the pressure on said salt-free fluid and increase the pressure on said incoming brine, continually withdrawing a portion of said salt-rich fluid from the separation chamber, delivering it to a crystallization chamber, heat exchanging said salt-rich fluid in said crystallization chamber, with a portion of said incoming brine, while maintaining the salt-rich fluid under a pressure in said crystallization chamber, substantially equal to that in the separation chamber, whereby to cool said salt-rich fluid and effect a phase separation between solid crystalline salt and supernatant brine saturated at the temperature and pressure of said crystallization chamber, and continually withdrawing a portion of said saturated brine from the crystallization chamber and delivering it to the cool pressurized brine being delivered to said separation chamber.

3. A method for crystallizing salt from brine comprising delivering brine to and introducing it into a separation chamber, establishing a temperature and pressure in the brine in excess of the critical pressure and temperature of pure water and sufficient in relation to each other to effect a phase separation between a lower layer of salt-rich fluid and an upper layer of substantially salt-free fluid, withdrawing a portion of said salt-free fluid from the separation chamber, heat exchanging said withdrawn salt-free fluid, while maintaining it under a pressure substantially equal to that in the separation chamber, with brine being delivered to said separation chamber, whereby to raise the temperature of said brine and cool said salt-free fluid, work exchanging said cooled pressurized salt-free fluid with cool low pressure incoming brine in a work exchange pump, whereby to reduce the pressure on said salt-free fluid and increase the pressure on said incoming brine, withdrawing a portion of said salt-rich fluid from the separation chamber, delivering it to a crystallization chamber, and heat exchanging said salt-rich fluid in said crystallization chamber with a portion of said incoming brine, while maintaining the salt-rich fluid under a pressure in said crystallization chamber substantially equal to that in the separation chamber, whereby to cool said salt-rich fluid and effect a phase separation between solid crystalline salt and supernatant brine saturated at the temperature and pressure of said crystallization chamber.

4. A method for crystallizing salt from brine comprising delivering brine to and introducing it into a separation chamber, establishing a temperature and pressure in the brine in excess of the critical pressure and temperature of pure water and sufficient in relation to each other to effect a phase separation between a lower layer of salt-rich fluid and an upper layer of substantially salt-free fluid, withdrawing a portion of said salt-free fluid from the separation chamber, withdrawing a portion of said salt-rich fluid from the separation chamber, delivering it to a crystallization chamber of substantial volume in relation to the flow rate of the salt-rich fluid, heat exchanging said salt-rich fluid in said crystallization chamber with a portion of said incoming brine, whereby to cool said salt-rich fluid and effect a phase separation between solid crystalline salt and supernatant brine saturated at the temperature and pressure of said crystallization chamber, and withdrawing a portion of said saturated brine from the crystallization chamber and delivering it to the brine being delivered to said separation chamber.

5. A method for crystallizing salt from brine comprising delivering brine to and introducing it into a separation chamber, establishing a temperature and pressure in the brine in excess of the critical pressure and temperature of pure water and sufficient in relation to each other to effect a phase separation between a lower layer of salt-rich fluid and an upper layer of substantially salt-free fluid, withdrawing a portion of said salt-free fluid from the separation chamber, withdrawing a portion of said salt-rich fluid from the separation chamber, delivering it to a crystallization chamber of substantial volume in relation to the flow rate of the salt-rich fluid, heat exchanging said salt-rich fluid in said crystallization chamber with a portion of said incoming brine, while maintaining the salt-rich fluid under a pressure in said crystallization chamber substantially equal to that in the separation chamber, whereby to cool said salt-rich fluid and effect a phase separation between solid crystalline salt and supernatant brine saturated at the temperature and pressure of said crystallization chamber, and withdrawing a portion of said saturated brine from the crystallization chamber and delivering it to the brine being delivered to said separation chamber.

References Cited

UNITED STATES PATENTS

| | | | |
|---|---|---|---|
| 1,204,716 | 11/1916 | Thorsell | 203—11 X |
| 2,330,221 | 9/1943 | Kermer | 159—45 X |
| 2,520,186 | 8/1950 | Von Platen | 159—2 X |
| 3,096,255 | 7/1963 | Redenbaugh | 203—92 X |
| 3,211,533 | 10/1965 | Witte | 23—273 |

FOREIGN PATENTS 667,359  6/1929  France.

OTHER REFERENCES

"Fresh Water from the Ocean" pages 143 through 151, 1954, Ronald Press, New York by C. B. Ellis.

NORMAN YUDKOFF, *Primary Examiner.*

J. SOFER, *Assistant Examiner.*